Sept. 15, 1970 R. H. THORNER 3,528,523
AUTOMOTIVE SPEED CONTROL SYSTEM
Original Filed Feb. 8, 1965 4 Sheets-Sheet 1

INVENTOR.
ROBERT H. THORNER

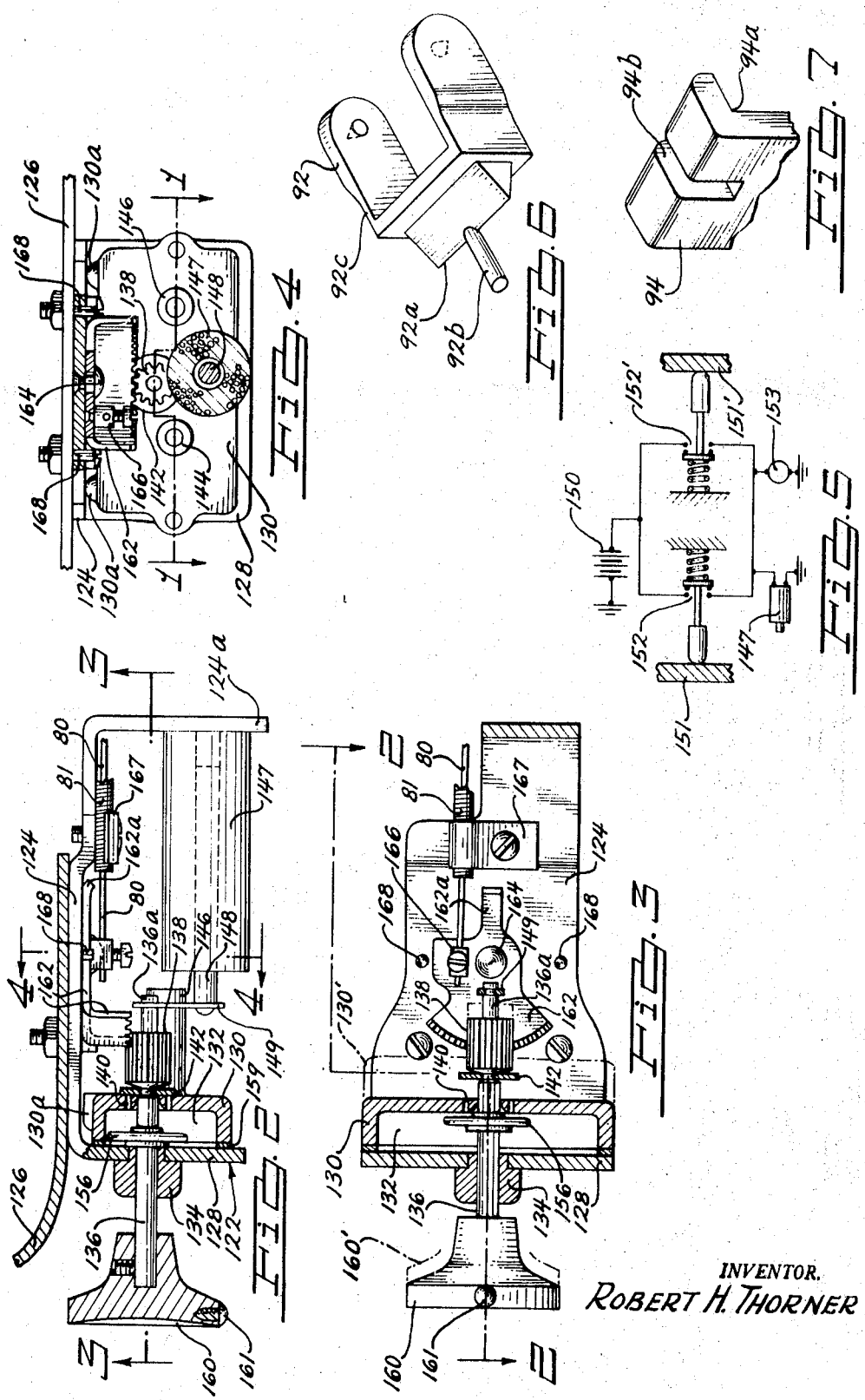

Sept. 15, 1970 R. H. THORNER 3,528,523
AUTOMOTIVE SPEED CONTROL SYSTEM
Original Filed Feb. 8, 1965 4 Sheets-Sheet 3

INVENTOR
ROBERT H. THORNER

Sept. 15, 1970      R. H. THORNER      3,528,523

AUTOMOTIVE SPEED CONTROL SYSTEM

Original Filed Feb. 8, 1965      4 Sheets-Sheet 4

INVENTOR.
ROBERT H. THORNER

United States Patent Office 3,528,523
Patented Sept. 15, 1970

3,528,523
AUTOMOTIVE SPEED CONTROL SYSTEM
Robert H. Thorner, 8750–F W. Chicago Blvd.,
Detroit, Mich. 48204
Original application Feb. 8, 1965, Ser. No. 430,910, now Patent No. 3,343,423, dated Sept. 26, 1967. Divided and this application Sept. 15, 1967, Ser. No. 668,121
Int. Cl. B60k *31/00*
U.S. Cl. 180—105        10 Claims

ABSTRACT OF THE DISCLOSURE

The main disclosure herein comprises an automatic speed control including mechanism providing a selective mode of operation which enables the driver when he chooses to resume a previously set regulated speed subsequent to slowing or stopping the vehicle. This selective control mechanism enables "automatic" reactivation of the speed-control device in response to a change in accelerator movement and is accomplished by advancement of the accelerator slightly beyond normal driving to initiate automatic acceleration to the regulated speed. A particular form of the invention for this mode of operation includes fluid restriction mechanism acting on the speed-setting spring of the governor mechanism to delay the change in the force of the spring, thereby to restrict the rate of automatic acceleration to safe values. Another result obtainable with this delay mechanism when desired is to enable reverse or negative speed-droop with stability, which can provide a subconscious surprise to reduce the tendency for "highway hypnosis."

---

The present application is a division of Ser. No. 430,910, filed Feb. 8, 1965, entitled "Automotive Speed Control System," now Pat. No. 3,343,423, which contains subject matter relating to the inventions disclosed in my following patent applications: Ser. No. 283,272, filed May 27, 1963, entitled "Speed Regulating Device," which is a divisional case of Ser. No. 74,315, filed Dec. 7, 1960, entitled "Vehicle Speed Regulating Device," now Pat. No. 3,153,325; Ser. No. 82,769, filed Jan. 16, 1961, entitled "Speed Regulator Device," now Pat. No. 3,213,691; Ser. No. 118,411, filed June 20, 1961, entitled "Throttle Control Mechanism," now Pat. No. 3,168,933; Ser. No. 266,257, filed Mar. 19, 1963, entitled "Automotive Speed Control Apparatus," now Pat. No. 3,305,042 and Ser. No. 316,987, filed Oct. 17, 1963, entitled "Automotive Speed Control System," now Pat. No. 3,222,227.

With the increasing use of non-stop highways, sometimes referred to as turnpikes, thruways, freeways, etc., there is an increasing need for an "automatic throttle" for automotive vehicles. When an automobile is driven for long distances on these non-stop highways, the operator's foot and leg muscles become tired and strained due to the necessity of holding the accelerator in various desired positions for long periods of time. A main purpose of all "automatic throttle" devices, as disclosed herein, is to enable the vehicle operator to drive without the necessity of holding his foot on the accelerator. Such devices are now believed to add safety in operating automotive vehicles because (1) they reduce fatigue, thereby reducing the tendency to fall asleep, (2) they maintain a selected speed, whereas in normal driving it is easy on long trips to exceed the intended speed unknowingly.

At the present state of the art, there is a wide difference of opinion among people at the automotive firms regarding what is desired for such speed control devices. These devices generally comprise (1) some type of means to regulate vehicle speed, either automatically (with a governor mechanism) or manually (hand-throttle), and (2) a selective control system to determine when and how the speed-regulating means is operated and rendered inactive or inoperative, and also to select the operating speed, etc.

A large difference in opinion exists particularly in the selective control system for the governing mechanism. Some of my present beliefs are discussed extensively in said application, Ser. No. 266,257. Some of these views, of course, may have to be altered in accordance with eventual public opinion, because of ultimate acceptance or rejection of the various systems offered. However, based on public acceptance to date, I presently believe that the eventual market will be large enough to support at least two basic automatic governor-type speed controls in addition to a good manual speed control (or hand-throttle). The first type of device is presently available to the public and comprises a "quality" speed control system. Such devices probably will find its largest sale on medium priced and luxury vehicles, and possibly for luxury models of lower priced vehicles. My said application, Ser. No. 266,257 discloses a control system that might fall in this category, as it provides features desired by some people (such as accelerator-resistance) who would pay a premium for such features. My centrifugal-liquid sensing and the governing system disclosed in my Pats. Nos. 3,068,849 and 3,084,758 provide such excellent governing characteristics to qualify as a "quality" governing device.

In certain regulator applications, such as for an automotive speed regulator in turnpike driving, reduction of cost is highly critical in order for such devices to gain wide public acceptance. Such desirable reduction of cost can best be achieved by inherent simplification of the mechanism, which may be justified even at some compromise in performance from that produced by the structures disclosed in my said co-pending applications. I believe that the eventual market will support a second "economy" speed control system in addition to the "quality" system discussed above. Such "economy" device will include a true "closed-loop" governing mechanism and a control system therefor, but all with certain compromises to enable low-cost manufacture. Such a device will desirably sell to the consumer at a price somewhat less than the price of the "quality" device.

A main object of the present invention is to provide a governor-type speed control system for an automotive vehicle particularly, but not necessarily, for carbureted internal combustion engines and which is very simple in construction thereby lending itself to low cost manufacture, and also disposed for simple installation in any kind of automotive vehicle.

All automotive speed control devices now offered commercially either must be manually reset after each brake actuation or the vehicle is automatically placed under control of the speed regulator only if and when the preset governed speed is attained. With the latter type control system, the vehicle driver, after turning the ignition key to its "on" position, must manually set the regulator control at least once in order to enable automatic operation; thereafter, the driver must wait until he manually accelerates the vehicle to the actual preset regulated speed before he can remove his foot from the accelerator. When the brake is depressed, the speed regulator is inactivated, but again the preset speed must be attained before the speed regulator again assumes control of the engine. After braking the vehicle to a stop, the speed regulator is rendered inoperative by restraining means operated upon turning off the ignition switch, so that the next driver must manually activate the speed control once after turning on the ignition switch.

The present invention relates in part to a novel control system for an automotive speed regulator mechanism which provides a vastly improved operation over the present control systems described above. The main utility of the control system of the present invention is to enable automatic activation of the control system only after partial but selective temporary advancement of the accelerator at a low speed, and then to provide completely automatic acceleration up to the preset speed at any time the driver chooses to employ such automatic activation. When the accelerator is deliberately and selectively advanced partially by the vehicle-driver, wherein the vehicle attains a speed somewhat less than the preset speed, the speed regulator device is activated and *automatically accelerates* the vehicle moderately to the set speed. This "automatic acceleration" action is more desirable than the action of present control systems as above described because (1) the operator does not have to wait until the set speed is attained each of the many times the device must be engaged in normal driving, and (2) the vehicle-operator can remove his foot from the accelerator and the vehicle will automatically seek out and stop accelerating at exactly the preselected speed in each of the many times the speed-governor action must be inactivated and re-activated in normal driving, and (3) by using the "Braille" system of speed selection, the vehicle-driver never has to look at the speedometer once he has learned the "clock" positions of the speed-setting knob, as will be described.

In actual practice I have found that these advantages greatly expand the use of such speed control apparatus to include city and particularly suburban driving (on main fast streets and boulevards), between the "rush-hours" of traffic, as well as for highway and turnpike driving, to be discussed further. This is true because my control system provides automatic acceleration in addition to automatic engagement. In boulevard driving in light traffic, it frequently requires about one-half the distance between stop lights to attain the preset speed; hence, in this example, not more than one-half of this distance can be under automatic control. I have found that in clear or light traffic about 90% of this travel can be under control of the speed regulator. In general, I have found that driving an automotive vehicle with the type of control system disclosed herein, increases the utility and driving pleasure to a degree which is very difficult to convey in words.

In order to achieve this highly desirable result, many puzzling problems had to be solved. It is essential that the system be completely safe and that no driver is ever surprised or startled suddenly by automatic acceleration when unexpected. For this reason, the ignition switch (or any other factor of engine operation) by itself is not acceptable as a means for operating the restraining means to render the speed control device inoperative because it would not detect a change in drivers at all times. This is true because the driver frequently leaves the vehicle while the engine is idling, and the next driver might be dangerously surprised when he advances the accelerator entirely unaware that the vehicle can be automatically engaged and accelerated.

My hand-throttle devices (such as Ser. No. 118,411) inherently produce a slow acceleration after automatic engagement. But governor or similar "closed loop" speed control devices tend to accelerate the vehicle rather rapidly, and under some circumstances can produce a dangerous "roar" of the engine that can startle the operator. Accordingly, a second problem is to provide that the rate of automatic acceleration is moderate.

Another puzzling problem in providing safe automatic acceleration is that the automatic activation or engagement cannot be speed-responsive as provided in present speed regulator devices. For example, assume that the regulated speed is set for 60 m.p.h. and the automatic engagement always occurs at 30 m.p.h.; and the vehicle is accelerated automatically to the preset speed each and every time this lower speed is attained. This type of automatic engagement and acceleration would occur at all times, even if the driver does not want or expect it; furthermore, the automatic engagement would occur at the same speed every time. The control system of the present invention is made *selective* since the automatic engagement occurs as a function of advancement of the throttle at the discretion of the driver completely independent of vehicle speed. I have found this method to be truly selective since the activation or engagement can be made to occur at any desired speed below (or even above) the preset speed.

Thus, in order to make this desirable control mode of operation available to the public, it is necessary to provide ample safety means to preclude any possibility of a surprise factor in any driving situation. Ample safety means are disclosed herein as will be described.

A very important object of the present invention is to provide a control system for an "automatic throttle" governor or speed regulator mechanism in an automotive vehicle, as recited in the preceding object, which requires the operator to partially and temporarily advance the control means deliberately in order to effect an automatic engagement or activation of the speed governor mechanism; and wherein such engagement is indicated to the operator by signal means dependent on the senses of sound and/or touch, and he then can remove his foot from the accelerator substantially before the set speed is attained; and thereafter the speed control apparatus effects automatic acceleration of the vehicle up to the preset speed, and such speed is automatically maintained thereafter in all vehicle attitudes.

In the automatic acceleration feature of the present invention as stated above, when an automatic speed governor mechanism is included, a high rate of acceleration is sometimes produced which is hazardous. In my hand throttles, such as disclosed in said application Ser. No. 118,411, the rate of automatic acceleration is inherently slow and hence I have found such devices to be completely safe for automatic acceleration. My said applications, Ser. Nos. 74,315 and 82,769, disclose automatic acceleration which is effected after partial advancement of the control means. Means are disclosed in my said application, Ser. No. 266,257, to retard the rate of automatic acceleration comparable to the inherent rate of acceleration with my hand throttle devices or to the acceleration with normal safe driving of any automotive vehicle.

Another object of the present invention is to provide an automotive speed control apparatus including a control system, as above recited, and also an automatic speed regulating mechanism, in which novel means are provided utilizing an inherent characteristic of manifold vacuum (of a carburetted internal combustion engine) without added mechanism to effect a retarded or safe rate of automatic acceleration.

Another important object of the present invention is to provide an automotive speed control apparatus including a control system, as recited in the second preceding paragraph, and also a speed regulating mechanism, in which novel mechanism is provided to retard the rate of automatic acceleration upon engagement or activation of the speed regulating mechanism and become ineffective upon attaining the preselected speed after said automatic acceleration.

An additional object of the present invention is to provide an automotive speed-control system as described in any of the preceding paragraphs, including a simple speed governor or regulator mechanism which includes novel means to enable automatic operation thereof only after the vehicle is manually accelerated to a speed slightly above the idle speed but below the lowest governed speed, wherein the regulator mechanism cannot be operated when the vehicle is at rest.

Still another object of the present invention is to provide a speed regulator mechanism for automotive vehicles in which novel reset means are provided to render the mechanism completely surgless at any desired speed droop;

and further to enable the use of a reverse or negative speed droop without surging which provides a repeating factor of surprise to the driver intended to reduce "highway hypnosis" in turnpike driving.

Another object of the present invention is to provide an automotive speed control apparatus including a control system, and an automatic speed regulating mechanism in which restraining means are provided operable, in one form, upon opening the vehicle door to render the automatic speed regulating mechanism inoperative until deliberately activated by the vehicle operator after entering the vehicle and closing the door; and in other forms such restraining means may be operated by the transmission manual control lever, or by the vehicle seat, or any other such vehicle element normally operated manually and selectively by the vehicle operator incident to his leaving (or entering) the vehicle.

Another object of the present invention is to provide an automotive speed-control system of the type described in the preceding paragraphs and having a carbureted internal combustion engine, in which engine vacuum is used as a source of energy in operating the governor system, and in which a supplemental restraining means may be provided to enable the vacuum itself to maintain the system operative (after manual initiation by the vehicle-driver), but automatically renders the system inoperative whenever the engine vacuum dissipates, for example, as a result of turning off the engine ignition.

Another object of the present invention is to provide in a control system for "automatic-throttle" operation in an automotive vehicle, and including a speed governor mechanism, novel means to permit actuating only the control means of the engine independently of the accelerator and linkage therefrom, but providing normal operative connection of the accelerator and engine control means when the governor mechanism is effectively inactivated.

A further object of the present invention is to provide a control system for an "automatic-throttle" mechanism in an automotive vehicle as recited in the foregoing paragraphs in which all of the control functions or operations may be accomplished by various movements of a single knob or dial, and to include tactile indicating means, if desired, so that only the sense of touch is required by the operator without removing his sight from the road.

Further objects and advantages of the invention will be apparent from the following description, taken in connection with the appended drawings, in which—

FIG. 2 is a partial sectional view of the selector mechanism of the control system for establishing the operating condition of the governor mechanism as disclosed in FIG. 1 and taken along the line 2—2 of FIG. 3;

FIG. 3 is another partial sectional view of the selector mechanism shown in FIGS. 1 and 2 and taken along the lines 3—3 of FIG. 2;

FIG. 4 is still another partial sectional view of the selector mechanism of FIGS. 1–3 taken along the line 4—4 of FIG. 2;

FIG. 5 is an electric circuit showing the action of the restraining means operated by a vehicle-door;

FIGS. 6 and 7 are perspective views of important details of the flyweight device shown in FIG. 1;

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

It is also to be understood that the present invention may be used in any kind of highway or road vehicle such as for automobiles and trucks, and may control any kind of engine therein such as an internal combustion gasoline engine or diesel engine, a gas turbine, etc. The governor mechanism disclosed herein has particular utility in combustion with the control system of the present invention. However, the control system may also be used with any other suitable speed governor mechanism or equivalent, or with any other kind of mechanism tending to correct throttle position in any desired manner.

The form of the invention illustrated by the automotive speed control apparatus shown in FIG. 1 will first be explained from a constructional standpoint before discussing the operation. The speed governor or regulator mechanism will first be explained in its automatic operation, and then the control system therefor will be discussed. The various components illustrated in FIG. 1 are shown in working cooperation primarily for ease of understanding and are not necessarily shown in true proportion.

SPEED GOVERNOR MECHANISM

The speed regulator mechanism illustrated in FIG. 1 includes two basic components or units, as follows: a sensor-brain unit, generally indicated by the numeral 5; and a servo-motor unit, generally indicated by the numeral 7.

Figure 1:
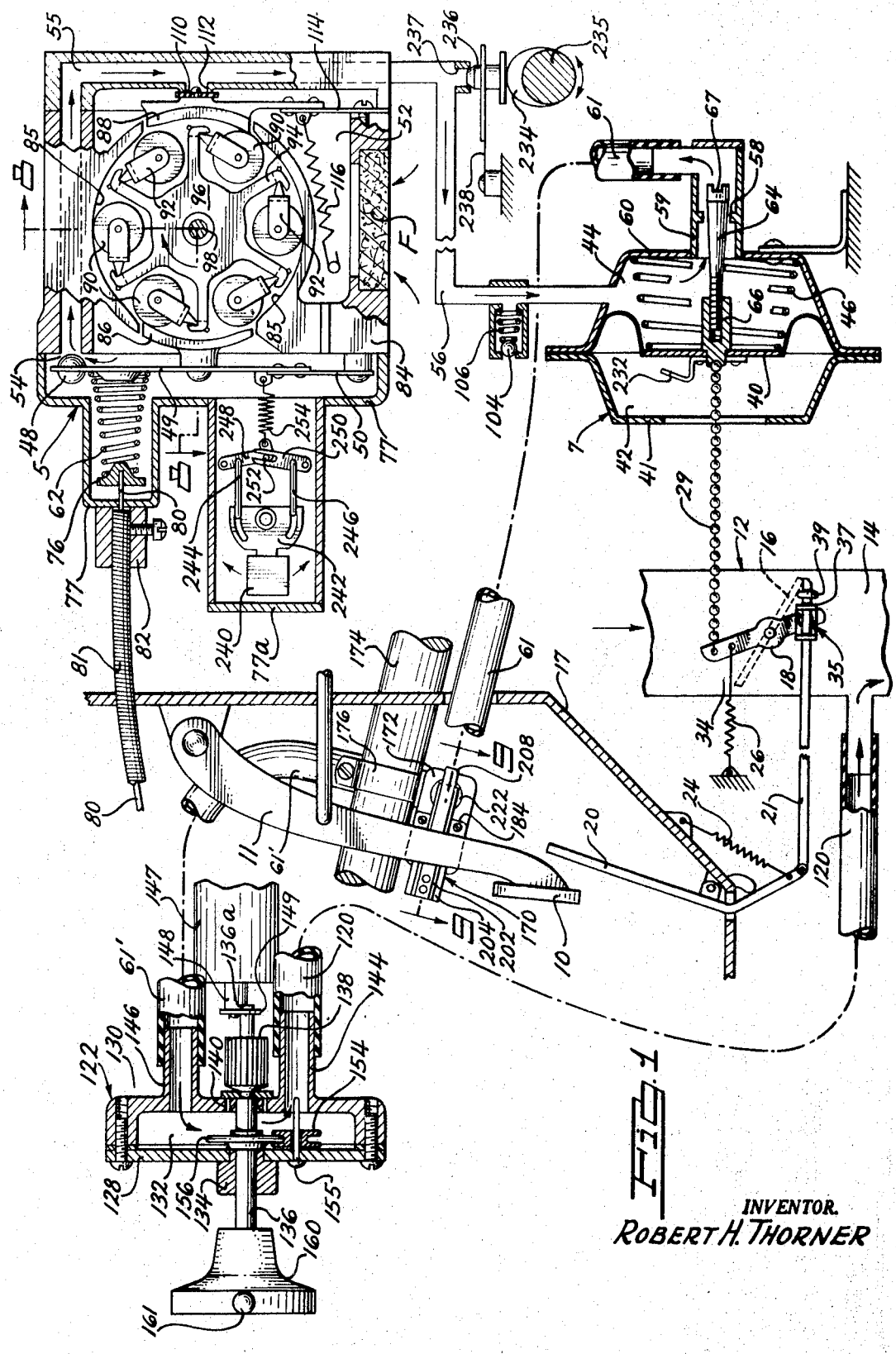
FIG. 1 is a somewhat diagrammatic view of a complete installation of one form of automotive speed control apparatus of the present invention mounted in an automotive vehicle and showing the cooperation of the control system and an automatic speed regulating mechanism, and in which the selector means of the control system is shown in section taken along the line 1—1 of FIG. 4.

In FIG. 1 there is shown a conventional brake pedal 10 supported by an arm 11, and carburetor 12 in an engine intake passage or manifold 14 and including a control member such as a throttle 16 with a lever 18, operated by an accelerator 20 hingeably connected to a floorboard 17 through a shaft or link 21 all biased in their idle-speed direction by an idle spring 24 and a lever spring 26, to be discussed hereinafter. The lever 18 and throttle 16 are operated by the speed-regulator mechanism through override or lost-motion means, illustrated in FIG. 1 as a ball-chain link 29 to enable actuation of lever 18 by the servo-motor 7. In the form shown, the accelerator linkage engages lever 18 by means of a second override or lost-motion unit 35 having a U-shaped member or bracket 37 carried by the lower portion of lever 18 and having holes to enable shaft 21 to slide therethrough. An abutment 39 is secured to the shaft 21 to enable actuation of lever 18 by the accelerator.

The override link means 29 is actuated by a pressure responsive member of the servo-motor 7, such as a diaphragm 40 having atmospheric pressure on one side thereof in a chamber 42 and vacuum on the other side thereof in a chamber 44. The vacuum-derived force of diaphragm 40 is biased or opposed by a servo-spring 46 which tends to close the throttle 16 when the regulator is in operation. The vacuum in chamber 44 acting on diaphragm 40 is modulated by a pilot valve 48 (illustrated as a ball) carried by a swingable arm 49 of the sensor-brain unit 5 supported for frictionless modulating movements at one end thereof by hinge means, such as a leaf spring member 50, which leaf member is rigidly mounted to a fixed portion of the sensor-brain unit by suitable means, as by a screw.

The pilot-valve 48 controls a fluid circuit in which air from the atmosphere passes through a filter F into a chamber 52 and then flows through an inlet orifice or restriction 54, and through a passage 55 in the sensor-brain unit 5, through a conduit or passage 56 which is in open communication with chamber 44 (preferably made of synthetic rubber tubing), then through an outlet orifice or restriction 58 in a tube 59 secured to a cover 60, and out through a conduit or passage 61 subsequently to the intake manifold 14 without further restriction during operation of the governor mechanism by means to be discussed further. The passage 61 is preferably made of synthetic rubber tubing.

The pilot valve 48 may assume any suitable contour, but in the form shown, the ball valve is held in alignment by leaf spring 50, or other hinge means, and is biased in a closing direction by a speeder-spring 62 for cooperation with restriction 54 to vary the aperture thereof. Spring 62 is preferably but not necessarily of variable rate, since the forces produced by the weight mechanism to be described vary as the square of the speed.

The pressure (vacuum) in passage 56 between the two restrictions 54 and 58 is applied to diaphragm 40. A tapered "re-set" valve 64 may be provided to be suitably connected to diaphragm 40 and is effective upon movements of the diaphragm and throttle 16 to vary the aperture at restriction 58 as a function of the position of the throttle. The chain link 29 is connected to diaphragm 40 by any suitable means, as by a ball in a socket. The socket includes a threaded portion 66 cooperating with mating threads of the valve 64. Adjustment of valve 64 by a screw slot 67 changes its effective relationship with the throttle 16, to provide speed-droop control.

When the pilot valve 48 is held closed by speeder-spring 62, substantially the maximum available vacuum exists in conduit 56 and chamber 44. When the pilot valve progressively is moved from its seated position to its full open position, by means to be discussed, the vacuum in conduit 56 and chamber 44 is modulated and *gradually* reduces to a value enabling full leftward travel of diaphragm 40 caused by spring 46. The maximum diaphragm vacuum obtainable in chamber 44 during regular operation, such as 5 to 7 inches of mercury for example, is established when the diaphragm 40 overpowers the force of spring 46 to advance throttle 16 until the vacuum reduces enough to balance the spring. For the same reason, the *minimum manifold* vacuum obtainable in the engine during the regulator operation is substantially the same as this *maximum diaphragm* vacuum. As valve 48 gradually opens to reduce the vacuum in chamber 44 from the maximum value, diaphragm 40 gradually moves to the left as a function of the travel of valve 48 to the left, and conversely, as shown in FIG. 1.

A novel centrifugal flyweight mechanism having rolling weights provides centrifugal forces that vary as a function of vehicle (or engine) speed, which forces act on the pilot valve to cause speed-responsive movements thereof as a result of changes in the centrifugal forces. The forces produced by the rolling weights are opposed and balanced by spring 62 which is manually adjusted by axial movement of a spring retainer 76 operated by a suitable shaft means inserted through a cover 77, such as a flexible shaft 80 controlled by the operator and slidable in a sheath 81, to be discussed further. A bushing 82 is secured to cover 77 by suitable means, as by staking, or is a part of cover 77. The sheath is inserted in the bore of the bushing, and secured, as by a screw.

Referring to FIGS. 1, 6, 7 and 8, a housing 84 includes fixed portions of a perimetrical surface, such as cylindrical surface 85 having spaces to accommodate a pair of radially movable portions such as the segments 86 and 88 which comprise part of the cylindrical surface. Surface portion or segment 86 is suitably secured to arm 49 to effect speed-responsive movements thereof in a manner to be described. A plurality of rolling (or sliding) weights 90, such as balls or rollers as illustrated, are each connected by frictionless means (as by pivots) to a yoke member 92 having a knife-edge 92a. The yoke member is connected for frictionless radial movements at knife-edge 92a to an arm 94 of a rotatable spider or impeller 96. The knife edges are fulcrummed at the corners 94a of arms 94 to enable the weights to be rolled in a generally circular path by impeller 96 which is suitably secured to a rotating shaft 98 for rotation thereby; the shaft is driven by the engine or transmission and in present vehicles usually comprises the flexible speedometer shaft of an automotive vehicle. The radial centrifugal force of each weight as it rolls (or slides) across the surface portion 86 is transmitted to arm 49 and balanced by spring 62 to position valve 48, which opens as the shaft speed increases, and conversely.

The speed-regulating action of the governor mechanism described thus far is as follows: When the rotary speed of the vehicle increases, the centrifugal force produced by the roller-weights urges the pilot valve 48 to the left biased by spring 62 to open the restriction 54 gradually as the speed increases. This action decreases the vacuum in chamber 44 in a modulated manner previously described, so that spring 46 moves diaphragh 40 to the left, as viewed in FIG. 1, which enables spring 26 to retard throttle 16 tending to restore the regulated speed. When the vehicle (or engine) speed decreases, the regulating action is the reverse of that above described, to advance the control means and restore or maintain the governed speed.

Figure 8:
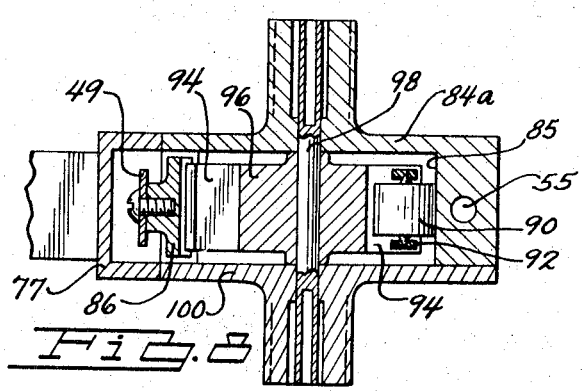
FIG. 8 is partial cross-sectional view of the centrifugal flyweight device of FIG. 1 taken along the line 8—8.

FIGS. 6 and 7 are enlarged perspective views of the yoke and spider arm, respectively. The yoke includes an extension 92b which projects through slot 94b in arm 94 to maintain the yokes in position to clear the end wall 84a of housing 84 and a cover piece 100 as shown best in FIG. 8. Also, for best results, the entrance radius of portion 86 is slightly greater than the radius of surface 85, whereas the trailing radius of surface 86 is slightly less than the radius of surface 85. In order to enable a smooth and continuous transfer of the rolling weights from the fixed surfaces 85 to the radially movable surface 86, the ends of each surface are suitably rounded or contoured for this purpose. In FIG. 8, it can be seen that the movable surface portion 86 (as well as portion 88 to be discussed) completely clears end wall 84a and cover 100. Since the swingable arm 49 and its leaf spring 50 are frictionless, the speed responsive movements of all parts moved radially by the rolling weights are completely frictionless. An important characteristic of this flyweight inventive combination is that the rolling weights are frictionless in radial speed-change-responsive movements. This is true because all rolling friction occurs in a direction transverse to the radial direction of movement and has no component in said radial direction. The only radial (angular) movements of the weights and yoke 92 is controlled at the knife-edge connection of elements 92a and 94a, which connection is completely frictionless in its radial speed-responsive movements. Hence, this novel centrifugal weight mechanism is completely frictionless, and has many useful applications other than for automotive speed regulating systems. However, this centrifugal weight mechanism is extremely simple and can operate at low driving torque so that the speedometer shaft is not overloaded which is an important consideration. Accordingly, while the weight mechanism has separate utility, per se, it has particular utility in a combination of elements comprising an automotive speed-regulating mechanism, and more particularly in combination with the remaining mechanism disclosed herein because of its overall utility and simplicity.

When the centrifugal weight mechanism is used as part of an automotive speed regulator, as illustrated in FIG. 1, it is preferable for the surface portion or segment 86 to be mounted toward the rear of the vehicle. Then, when the vehicle is accelerated automatically, the additional inertia forces of the weights cause valve 48 to open early which effects operation of the regulator mechanism before the stable preset speed is attained. This action results in a "soft" cut-in of the regulator mechanism.

As illustrated in FIGS. 1, 6 and particularly FIG. 8, the rolling weights are retained by pivots mounted in conical recesses in the arms of yoke 92. The arms have narrowed sections 92c to provide a spring action for enabling the weights to be snapped in place. As an alternative, the weights may be secured to the yoke wherein the weights slide instead of roll on the cylindrical surface; however, with this construction the elements must be made of low friction materials to minimize the frictional drag on the speedometer shaft. When the vehicle moves in a backward direction, the rotary speed of impeller 96 is very low and the arms 94 move the weights in a reverse direction. Although the rolling weights are illustrated as being pushed by the yokes 92 in regulator operation, they could be arranged to be pulled by the impeller arms 94, if desired, to provide the same rolling action without departing from the spirit of the invention.

The diaphragm 40 and spring 46 are selected to hold the throttle at its maximum opening at the highest practical *diaphragm* vacuum such as 5–7 inches of mercury in passage 56 and chamber 44. As previously described, the necessary diaphragm vacuum is determined by the force of spring 46 and the size of diaphragm 40. It is desired to use as high a diaphragm vacuum as possible, which might be termed the "critical vacuum," in order to provide sufficient force to operate the throttle and any associated linkages. However, as the total *available* manifold vacuum tends to fall below this critical value (as when ascending steep hills) the throttle gradually is retarded by diaphragm 40 to maintain this vacuum (while the pilot valve is closed by spring 62 "trying" futilely to increase the diaphragm vacuum) so that the desired regulated speed cannot be maintained thereafter. Thus the maximum *diaphragm* vacuum must be chosen to compromise these opposing factors. As the pilot valve 48 opens when the *manifold* vacuum is above the critical value, the *diaphragm* vacuum gradually reduces from its maximum as above noted by movement of the pilot valve to an amount which enables spring 46 to retard throttle 16 as required. Hence the diaphragm 40 will not start moving to the left, as viewed in FIG. 1, until the vacuum in chamber 44 is reduced by movement of pilot valve 48 to be less than the value of this critical vacuum. Thus, if the spring 46 is selected to enable the governor mechanism to maintain the governed speed at 5 inches of mercury, for example, the size of diaphragm 40 would cause it to start moving at a lesser vacuum, such as 4¾ inches of mercury, for example, when the pilot valve starts to open. The total leftward travel of diaphragm 40 to close throttle 16 might be effected when the pilot valve opens enough to produce a still lesser vacuum, such as 2½ inches of mercury, for example, determined by the rate of spring 46. The foregoing concept is utilized in a novel manner to facilitate automatic acceleration at a limited rate, to be discussed further hereinafter.

When the operator accelerates the vehicle manually at a moderate rate with the throttle producing a higher manifold vacuum, such as 12–14 inches of mercury, for example, this higher vacuum acts on the exposed portion of the pilot valve and might delay its opening slightly to a higher speed than selected. A relief or regulator valve 104 which is biased by a light spring 106 is set to open at a manifold vacuum of about 6–7 inches of mercury, with the foregoing example, for limiting the vacuum in passage 56 and chamber 44 to this value by bleeding air thereto. This vacuum is high enough to hold diaphragm 40 in its extreme right position until the pilot valve opens.

The centrifugal weight mechanism as disclosed herein includes means to preclude operation of the speed regulator mechanism until the vehicle has actually attained a low predetermined speed, such as 15–20 m.p.h. for example. As illustrated herein, the cut-out mechanism comprises a valve 110 cooperating with an orifice 112 to bleed air into passages 55, 56 in parallel with the pilot valve 48. The bleed valve, illustrated as rubber or the like, is secured to the radially movable portion or segment 88, which is supported for frictionless swingable movements by a leaf spring 114, or equivalent hinge means. The assembly of segment 88, valve 110 and hinge 114 is biased in an opening direction by a light spring 116 in opposition to the force of weights 90 rolling on portion 88. When the vehicle is at rest, spring 116 holds valve 110 open to bleed air into passages 55, 56 and chamber 44 to render the regulator mechanism inoperable. When the vehicle attains a speed determined by spring 116, such as 15 m.p.h., the weights 90 close valve 110; then at all speeds above 15 m.p.h., the control of the regulator mechanism is determined by the pilot valve 48 and by selector control means, to be discussed Whenever the vehicle speed falls below the illustrated speed of 15 m.p.h. regardless of the reason, the regulator mechanism cannot be activated in any manner.

When the terms "pressure" or "vacuum" are used herein, they both refer to a pressure differential. Positive pressure is the difference between a post-atmospheric absolute pressure and the atmospheric pressure. Vacuum is the difference between a sub-atmospheric absolute pressure and the atmospheric pressure.

SELECTIVE CONTROL SYSTEM

Automatic throttle devices now in use are so arranged that the vehicle must actually attain the set speed before the regulating mechanism can be activated. It is my intention in the speed-regulating mechanism of the present invention to provide safe automatic acceleration after the device is safely engaged or activated at any speed below the set speed at which time the driver removes his foot from the accelerator after hearing an audible signal; and then the vehicle automatically accelerates slowly or moderately from the engaged speed to the preset speed. Hence, the main utility of the control system of the present invention is to effect such automatic activation only after a partial and temporary advance of the throttle or accelerator. Then when the throttle is deliberately and selectively opened temporarily by the vehicle-driver (while the vehicle attains a speed somewhat less than the preselected speed), the speed regulator device is activated and automatically accelerates the vehicle moderately to the preset speed. The audible signal is produced upon such activation to indicate that the driver's foot can be removed from the accelerator.

In utilizing the present invention as an automatic throttle for turnpike driving, I provide a control system operable preferably only after the driver enters the vehicle and the doors are closed which enables the device to be initially activated by the driver. In the form shown, such control system includes a valve unit having an activation valve operated by movement of the brake pedal to shut off or open the source vacuum to the speed regulator; and as part of the control means I further provide automatic engagement or activation means operated as a function of movement of the accelerator pedal or throttle which opens the valve to automatically re-activate the regulator device after a partial and temporary advancement of the accelerator pedal. In the forms shown herein, such automatic activation means may comprise a diaphragm exposed to manifold vacuum which opens the activation valve after the throttle opens enough to reduce the manifold vacuum sufficiently to cause such automatic activation or engagement.

My control system also may include a second shut-off safety valve which is initially opened by a first depression of the brake pedal and thereafter is held open by manifold vacuum; but the safety shut-off valve is automatically closed whenever the vacuum dissipates for any reason. The safety valve is again opened automatically only upon the first brake actuation and providing manifold vacuum again exists in the supply tube. I also include in my control system selector valve means in the vacuum source conduit, which valve is manually and selectively opened by the driver, but is automatically closed by restraining means operated by the vehicle door, or by other suitable restraining means initiated upon activation of a driver-operated movable element of the vehicle which detects a change of drivers. Manually operated (safety) means are associated with the restraining means for enabling manual operation of the restraining means at any time to render the speed control device inoperative, and precludes operation of the restraining means until it is operated deliberately by the driver. Thus, in the preferred form of my control system, the device is automatically rendered inoperative by restraining means operable incident to the driver leaving the vehicle and can only be set for activation by the driver selectively and deliberately after each time he closes the door (and if he moves the transmission lever into "drive" position if this factor is provided); and thereafter the device is automatically activated finally upon a partial and temporary advancement of the accelerator until an audible signal is heard following each temporary inactivation of the device by normal operation of the brake pedal.

The control system, in the form of the invention illustrated herein, includes two main components for controlling the transfer of vacuum to the tube 61 from another tube or conduit 120 (preferably made of synthetic rubber) to supply vacuum from the manifold 14 as a source of energy or power to the servo-mechanism in the "governor" portion of the system. A main component of the control system is a selector mechanism or unit, generally indicated by the numeral 122. The selector unit of the present invention includes a manually-operated member or means movable upon operation at least once by the vehicle-driver to open a valve for transferring or communicating the full vacuum from the manifold 14 through tube 120 and another tube 61' to the tube 61. The vacuum is maintained in these supply tubes by the manually operated member at least when the vehicle driver remains in the vehicle or unless the manually-operated means is deliberately returned to its inoperative position by the driver thereby shutting off the vacuum to preclude transfer thereof to the servo-motor. If the operator fails to move the manually operated means to shut off the valve, automatic restraining means are provided in which the selective movement of an element of the vehicle, such as opening a door, automatically causes movement of the manual means to shut off the valve; then the operator again must consciously move the manual means deliberately to enable activation of the system.

Referring to FIGS. 1–4, the form of the selector unit illustrated herein includes a mounting bracket 124 suitably secured to a fixed portion of the vehicle in the driver's compartment, such as by screws fastened to the underside of the instrument panel 126. The bracket includes a downturned portion or plate 128 which is secured, as by screws, to a cover or cup member 130 to form a chamber 132. A bushing 134 is suitably secured to plate 128, as by staking or soldering, and includes a bore to guide and support a shaft 136 for axial movements in relation to the bushing. The shaft extends through chamber 132 and also through a clearance hole in cover 130 and carries a pinion gear 138 suitably secured to a portion of the shaft 136a having a reduced diameter to receive the gear.

One or more air vents, illustrated as holes 140, are provided in cover 130 radially equidistant from shaft 136. The holes are covered and closed by a disc-valve 142 (FIGS. 2 and 3) inserted on the small diameter 136a of shaft 136 and retained by the gear between it and the step in shaft 136.

The cover 130 includes two hose nipples 144 and 146 to receive tubes 120 and 61', respectively. Nipple 144 is selectively covered or opened unrestrictively by a valve body 154 supported by a stem or shaft 155 made of any suitable rod or pin (FIG. 1). The stem is secured to and supported by plate 128 by suitable means, as by riveting, staking, soldering, etc., so that the stem is restrained from axial movements. The valve body 154 has suitably flanged ends and slides with small clearance on stem 155 for axial movements in relation thereto for purposes to be described. An actuating disc 156 is suitably secured to shaft 136 and extends between the flanged ends of valve body 154 to produce axial movements thereof upon axial movements of the shaft 136, while enabling rotation of the shaft.

Any suitable speed-establishing means may be provided. In the form of the invention illustrated herein, a knob 160 having a single tactile "Braille" indicator 161 on its periphery is secured to shaft 136, as by a set screw (FIG. 2), to facilitate axial and rotary movements of the shaft as required, to be explained.

Referring to FIGS. 2, 3 and 4, means are provided in the selector unit to translate rotary movements of the knob to axial movements of the flexible shaft 80 in any desired ratio. In the example shown herein, such means comprise a circular rack-piece 162 connected to the mounting bracket 124 for freely moving angular movements by a suitable hinge pin 164. A conventional swivel 166, as used for carburetors, is hingeably secured to rack-piece 162; and flexible shaft 80 is inserted through the swivel and retained by the usual screw provided with the swivel, as shown. The sheath 81 is secured to the mounting bracket 124 by a clamp 167 fastened by suitable means, as by a screw. In this manner, angular movements of the rack-piece produce axial movements of the flexible shaft.

Thus, the knob 160 is revolved by the driver to select the governed speed, by causing such angular movements of the rack-piece to move shaft 80 and vary the force of speeder spring 62 as desired. A pair of stops 168 are secured to (or are a part of) the mounting bracket 124 to limit the rotary movement of the rack-piece so that the knob 160 can be rotated only one complete turn. The same result may be achieved by any other equivalent stop means, such as by limiting the shaft itself. Then the entire speed range of the speed-regulator mechanism is calibrated to fall within this one turn; this may be accomplished in the present invention by varying the rate of spring 62 and/or varying the radial position of the swivel 166 as desired. The driver memorizes the speeds corresponding to various "clock" positions of the tactile indicator 161. Thereafter, he rotates the knob by feeling the tactile indicator to establish the correct "clock" position for the desired speed. In this manner the driver can select the governed speed at any time without removing his sight from the road. The tactile indicator in FIGS. 2 and 3 is shown positioned at six o'clock with the gear 138 in the middle of its travel with respect to the rack-piece 162. In FIG. 1, the tactile indicator is shown in its twelve o'clock position when the rack-piece contacts either of its stops 168. The rack-piece 162 includes an extension 162a prebent to provide a friction force when retained by hinge pin 164, to maintain knob 160 in any set rotary position. A solenoid 147 is secured to a downturned portion 124a of bracket 124 and includes an armature 148 having a link 149 connected to extension 136a but adapted to enable rotation of shaft 136. Referring to FIG. 5, the circuit for solenoid 147 includes the vehicle battery 150 in series with the parallel connection of the vehicle-doors, such as doors 151 and 151', to control the usual spring-biased switches 152 and 152', respectively. The vehicle door switches are in series with the usual "dome" light 153 which is provided in most automotive vehicles.

The valves 154 and 142 of the selector mechanism may be replaced by any equivalent valve means such as a slide valve, or a spool valve sliding in a bore to control ports, etc., without changing the spirit of the invention.

Figure 9:
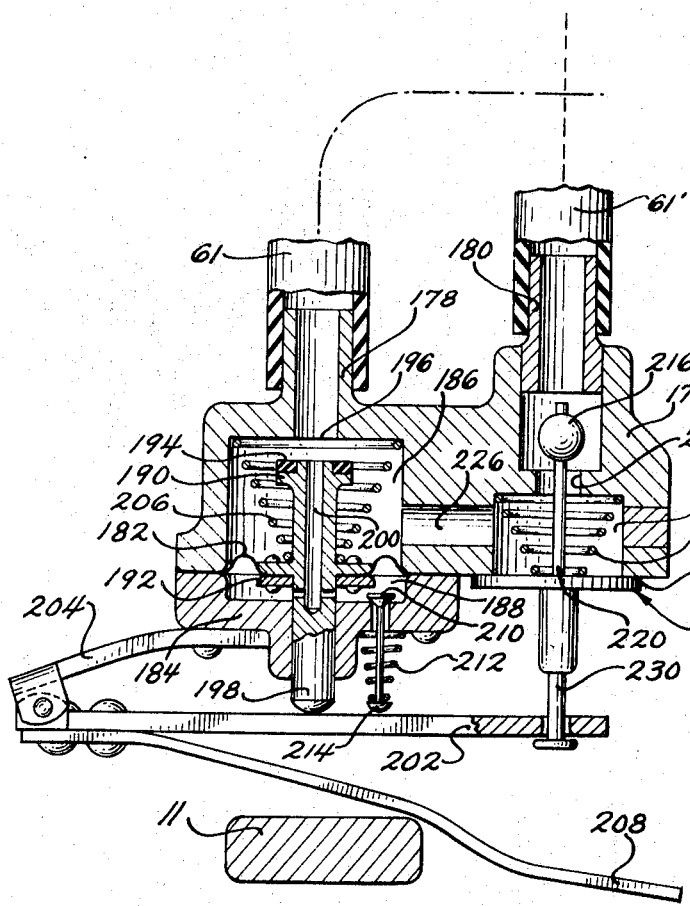
FIG. 9 is a partial sectional view of the brake-operated release means including throttle-responsive activating means as taken along the line 9—9 of the valve unit 170.

The selective control system also includes means to enable safe automatic acceleration (sometimes called, "Resume Speed") in a manner which is initiated from a condition of normal driving, since the driver's foot initially must be on the accelerator. In the form of the invention disclosed in FIG. 9, the second component of the selective control system as shown in FIGS. 1 and 9 comprises a valve unit 170 in a housing 172 which is secured to the steering post 174 (or some other fixed portion of the vehicle) by a bracket 176. The housing includes hose nipples 178 and 180 to receive tubes 61 and 61', respectively (as shown only in FIG. 9), for transferring manifold vacuum from the selector unit to the servo-motor. Referring particularly to FIG. 9, the valve unit 170 includes a diaphragm 182 clamped between housing 172 and a cover 184 by suitable means, as by screws, to form a pair of chambers 186 and 188. A brake-operated activation valve 190 includes a flange portion secured to diaphragm 182 by bonding, or by a clamping action of a disc 192 secured by rivets, or the like. Valve 190 includes a sealing portion or member 194 adapted to open or close a port 196 communicating with vacuum tube 61' and tube 61. Valve 190 includes a stem 198 slidable in a bore in cover 184 to enable axial movements of the valve while sealing chamber 188. The valve stem includes an internal air passage 200 which always connects chamber 188 with only the upper end of valve 190, as shown in FIG. 9.

A bar 202 is hinged to a fixed support 204 to enable swingable movements of the bar for actuating valve 190 biased by a spring 206 acting on the valve. A firm leaf spring actuator 208 is secured to bar 202, as by rivets, and is mounted at an angle to the bar to contact the engine-side of the brake arm in its idle position, as shown in FIG. 9. The actuator 208 is sufficiently firm that bar 202 normally moves as though it were a rigid portion of the actuator. Whenever the brake pedal is depressed it acts on a suitable angle-portion of actuator 208 to cause swingable movements of bar 202 and axial movements of valve 190. If the valve unit 170 is mounted too close to the brake arm, valve 190 would seat on port 196 before actuator 208 moves to the side of the brake arm when it is fully depressed. In this event, the leaf spring 208 merely bends sufficiently to enable the full travel of arm 11 since the spring force of actuator 208 is much greater than the force of spring 206. Also, a bleed-valve 210 is biased by a spring 212 and normally closes an atomspheric air vent to chamber 188. The valve 210 includes a stem 214 actuated by the bar 202 to open the bleed valve whenever the brake pedal is depressed.

If desired for extra safety, the valve unit 170 may include a safety shut-off valve 216 which is adapted to open or close a second port 218 in series with valve 192 and its port 196. Valve 216, as exemplified in FIG. 9, comprises a ball supported by a stem 220 secured to a pressure sensitive member illustrated as a movable disc 222. The disc seats on a surface of housing 172 to form a chamber 224 which communicates unrestrictedly with chamber 186 through a passage 226. Hence, the disc 222 comprises a movable pressure-sensitive wall of chamber 224 and is biased in a direction to open the chamber to atmosphere by a spring 228. The disc 222 includes a lost-motion extension 230 which projects through an aperture in bar 202 to cooperate therewith in a manner to be described. The area of the disc and force of spring 228 are selected so that a vacuum of only about 1 to 1½ inch of mercury is sufficient to hold disc 222 closed and valve 216 open.

The overall operation of the control system will now be described, assuming the driver has entered the vehicle and started the engine with the knob 160 in its "off" position, in which all parts connected thereto are in their rightward position as would be viewed in FIG. 3. In this condition, the valve body shuts off vacuum from tube 120 so that atmospheric pressure exists in tube 61', tube 61 and in the valve unit 170. At this time, referring to FIG. 9, valve 190 is held open by spring 206 since the pressures in chambers 186 and 188 are atmospheric; also, the spring 228 forces disc 222 to open chamber 224 to the atmosphere and to hold valve 216 on port 218. When the driver wants to activate the speed control mechanism in the form shown, such as when the vehicle is in motion, he must perform at least three deliberate and conscious steps to produce such activation. First, the knob 160 is pulled out into its "on" position at any desired vehicle speed, so that all parts connected thereto stand in their leftward position, as shown in FIGS. 1 and 2. At this time, the left end of gear 138 acts on disc-valve 142 to close the air vents 140 and simultaneously open valve body 154 to transmit the full undiminished manifold vacuum to chamber 132, tube 61' up to valve 216, which is still closed.

The second deliberate action by the driver comprises the first depression of the brake pedal after pulling knob 160 to its "on" position. At this first brake-actuation, the bar 202 closes chamber 224 while opening valve 216, so that manifold vacuum acts on disc 222 to maintain same in its closed position with valve 216 open as long as vacuum is supplied in tube 61'. This same brake-actuated movement of bar 202 acts on stem 198 to close valve 190 on port 196. This action also opens the bleed valve 210 so that atmospheric pressure exists in chamber 188, air passage 200, tube 61, chamber 44 and passages 56 and 55. At the same time, the full manifold vacuum is transmitted to chamber 186 and on the upper side of diaphragm 182 (as seen in FIG. 9) to overpower spring 206 and hold valve 190 tightly closed against the port 196.

The third selective action by the vehicle-driver is performed whenever the driver chooses to effect final activation of the speed regulator mechanism. If automatic acceleration is desired to a previously set or preset speed of 65 m.p.h., for example, the driver normally accelerates the vehicle to a moderate speed such as 15–20 m.p.h. so that valve 110 is closed. Then the driver smoothly but firmly (in a deliberate selective operation) depresses the accelerator to temporarily open throttle 16 and reduce the manifold vacuum sufficiently to enable spring 206 to overpower the vacuum force of diaphragm 182. This action opens valve 190 which enables the manifold vacuum to be transmitted through tube 61 to the speed-regulator mechanism for activation thereof. At this time the manifold vacuum is applied to both sides of diaphragm 182 so that spring 206 thereafter holds valve 190 open at all subsequent values of manifold vacuum. The driver can now remove his foot from the accelerator pedal (at a vehicle speed of about 20 m.p.h in this example), and the vacuum acts on diaphragm 40 to open the throttle which causes automatic acceleration from this lower speed. When the diaphragm is activated by this vacuum, a leaf spring clicker 232 carried by the diaphragm moves past the cover 41 to produce an audible "click" signal for advising the driver that the regulator mechanism is activated. The vehicle is then accelerated automatically up to the preselected regulated speed established previously by pulling knob 160 when set to provide the desired speed. When the preset governed speed is attained, the pilot valve 48 is automatically opened by the roller weights 90 to bleed air into chamber 44 through conduits 55 and 56; and thereafter the governor mechanism automatically maintains this preselected speed in the speed-regulating action at all loads, as previously described. The operator can override the governor action at any time by depressing the accelerator enabled by the lost-motion chain-link means 29, and when he removes his foot from the accelerator the vehicle speed returns to the preset governed valve.

The valve of manifold vacuum that causes valve 190 to open upon advancing the accelerator, as described in the preceding paragraph, is established by the force of spring 206 (for a given size of diaphragm). This value of manifold vacuum can be established initially in a very small range, but I have found values of 3.5 to 5 inches of mercury to be satisfactory. If this vacuum is set at a higher value, such as 7–8 inches of mercury, the accelerator is not depressed as much as for a lower vacuum setting.

It is important to realize that this automatic engagement is effected primarily as a function of throttle position substantially independent of engine speed, because manifold vacuum predominently is a function of throttle position, particularly near road-load operation. If the driver desires to accelerate manually, for example when he might be following other vehicles temporarily, he depresses the accelerator moderately—that is, only to positions providing values of vacuum above that for releasing valve 190. I have found that by this means, the driver actually can exceed the preset speed without activating the regulator mechanism. This is very useful when following slow variable-speed traffic. When the traffic clears, the driver merely advances the accelerator as above described until he hears the sound of clicker spring 232, and he again removes his foot from the accelerator pedal. Another click signal is produced when the stem 198 strikes bar 202, which signal also indicates that activation has occurred.

When the brake pedal is depressed to retard vehicle speed, valve 190 closes to shut off all vacuum to chamber 44, and then is held closed by manifold vacuum as previously explained. Instantly the spring 46 moves diaphragm 40 to its extreme leftward position out of the way of normal accelerator movement, so that spring 26 moves the throttle to its idle position. At this time, valve 48 is closed and valve 110 is again opened after the vehicle speed reduces to zero. This brake release does not affect valve 216 which remains open since the bar 202 merely slides on the lost-motion stem 230. Since valve 154 remains open, the full manifold vacuum is maintained in chamber 132 if a door is not opened, so that the selector mechanism is unaffected by depressing the brake pedal. When the brake pedal is released and valve 190 is held closed by diaphragm 182, vacuum is not transmitted through tube 61 to orifice 58. In addition while the vehicle is at rest, the governor mechanism is maintained inactive because of the air-bleed past valve 110 as previously explained. In order to re-activate the governor mechanism, it is not necessary to reset knob 160 in any way. It is only necessary for the driver to selectively advance throttle 16 (after the vehicle attains a speed of 5–15 m.p.h. which causes valve 110 to close) to a position that lowers manifold vacuum to about 4 inches of mercury. This causes valve 190 to be opened by spring 206 so that vacuum is transmitted instantly to the orifice 58, and the diaphragm 40 again opens the throttle to automatically accelerate the vehicle to the preset speed, as described above.

Referring to FIG. 1, if desired, the value unit 170 may be installed in tube 120 between the intake manifold and the selector unit 122. In this event, after the engine is started and before knob 160 is pulled out, the value 190 is closed on port 196 at the first normal brake actuation, so that the brake pedal does not have to be depressed once after pulling out knob 160. However, the installation shown in FIG. 1 may be preferable from a safety standpoint because an extra conscious effort is required of the driver after he deliberately pulls knob 160.

If the disc 222 is made smaller to release at 2 to 3 inches of mercury, for example, the regulator will be rendered inoperable automatically each time the accelerator is depressed to wide-open-throttle position. This calibration can be used, if desired, to discourage "hot rod" acceleration.

It is also important to realize that the combination of the disc 222 and valve 216 can be used by itself in any automotive speed regulator mechanism having source of pressure or vacuum to power the device. In this combination, the safety shut-off valve with the disc 222 acts as a safety mechanism to lock out the regulator mechanism after the manifold vacuum dissipates; and requires a first actuation of the brake pedal after the engine is started to enable activation of the regulator mechanism.

Restraining means are provided to automatically render the regulator mechanism inoperative to preclude any dangerous situation, for example whenever there is a change of drivers. The main purpose of the restraining means is to enable the use of the automatic engagement or activation means with automatic acceleration by preventing a dangerous surprise factor whenever there is a change of drivers, or even if the same driver leaves the vehicle for extended periods and might forget that the device is ready to be engaged. For example, without the restraining means and safety means, but with automatic engagement means and automatic acceleration provided, if another driver enters the vehicle while the engine is idling, he might be surprised not knowing that the speed regulator is engaged, or worse, not even be aware that such a device exists or is on the vehicle. The restraining means disclosed herein automatically causes the speed control device to be rendered inoperative incident to normal selective operation of an element of the vehicle by the driver, which selective operation normally occurs whenever there is a change in drivers (while the vehicle would be at rest) so that the desired result is accomplished.

In the examples illustrated herein, the restraining means includes or is operated by a selective vehicle element such as a vehicle door, or by movement of the driver's seat, and/or transmission selector means. The terms "restraining means" and "selective vehicle element" when used in the claims all relate to the potentially dangerous condition when there is a driver-change with the speed-control device set for automatic activation, occurring of course after the vehicle is brought to rest in the examples disclosed herein. The control device is rendered inoperative incident to operation by the vehicle-driver of an element which is a part of the vehicle, and is operable at his selection normally or usually when the vehicle is immobile, and accompanies a change in drivers or when one driver leaves the vehicle for a while and returns later thereto.

The "vehicle-element," illustrated herein is "selective" by the driver in the sense that in normal operation of the vehicle, it is the driver's choice or selection to open a door, for example; and the speed-control device is *automatically* rendered inoperative incident to and as a result of this selective movement of this vehicle-element, which selective movement normally accompanies a change in drivers as desired. In the foregoing example, "normal operation of the vehicle" is intended to cover any normal driver operation required between the times when the vehicle stands alone without a driver both before and after it is driven; and any element necessary to be operated by the driver "selectively" to perform such driver-operation between these times may be utilized if it qualifies broadly as above described.

The particular examples of restraining means illustrated herein comprise a combination including manually operted shut-off means. Therefore it is first necessary to consider the manual shut-off action of the selector unit 122 described above, as shown in FIGS. 1–4, which might be considered as safety means. If at any time, the driver wishes to render the automatic throttle or governor action inoperative manually, he pushes knob 160 "in" to the right, as viewed herein. As shown in FIGS. 1–3, the shaft 136 moves disc valve 142 to open the vents 140; and simultaneously the valve body 154 is moved to cover the inlet of nipple 144. At this instant, the knob is in the position shown in FIG. 3. The vacuum instantly dissipates from chamber 132, tubes 61', 61, 56 and chamber 44, and diaphragm 40 is moved to the left out of operation as previously described. At the same time, the dissipation of vacuum on disc 222 enables spring 228 to open the disc and close valve 216; this action exposes chamber 44 and passages 61, 55 and 56 to atmospheric pressure regardless of any other factors. The vacuum is cancelled until knob 160 is pulled out and valve 216 is forced open and held open by disc 222 after the engine is started and the brake pedal is again depressed once. Hence, in order to set the speed regulator mechanism ready for operation, the vehicle-driver must again deliberately pull knob 160 out into the position shown in FIG. 1. If this is performed while the vehicle is being driven, the driver can activate the automatic regulator as described above, but only after depressing the brake pedal once.

Now consider the action of the restraining means illustrated in FIGS. 1, 2 and 5. Whenever a vehicle-door 151 is opened for any reason, such as produced by a change of drivers, the door switch 152 closes which energizes solenoid 147 and the usual dome light 153; this action causes armature 148 to pull shaft 136 to the right, as shown in FIG. 1, which instantly shuts off all vacuum in chamber 132 and tube 61' in the same manner as described above for the manual shutoff when shaft 136 is moved by pressing knob 160 to the right. Also, as above described, the vacuum in the valve unit 170 dissipates so that valve 216 is closed. Any new driver must deliberately and consciously pull knob 160 to enable subsequent activation of the regulator mechanism by depressing the brake pedal once, and thereafter advancing the throttle until clicker 232 is heard. Then the foot can be removed from the accelerator and the vehicle will automatically accelerate to and maintain the preset speed, until the brake pedal is depressed, or the knob 160 is pushed in, or the door 151 is opened upon leaving the vehicle.

An alternate or supplemental restraining means is also disclosed in FIG. 1. In this form of restraining means a cam 234 is caused to revolve when the usual transmission selector shaft 235 rotates when moving the transmission selector member from one position to another. In "drive" position, the cam holds a valve 236 in a position to close a port 237 of passage 56. The valve is supported by a leaf spring 238 which is prebent to bias the valve open against the cam. When the transmission lever stands in "drive" position with valve 236 closed, the regulator mechanism operates in a normal manner. Whenever the transmission selector lever is moved out of "drive" position, valve 236 opens which bleeds in enough air to render the regulator mechanism inoperable until the selector member is again moved into "drive" position.

The door operated restraining means is believed preferable because it always detects a change in drivers. While a transmission operated restraining means usually detects a change in drivers, sometimes a driver will stop the vehicle and leave the car with the engine idling and with the parking brake locked while the transmission lever remains in "drive" position. In this instance the transmission-operated restraining means will not detect a change in drivers. Also, with the door-operated restraining means, the driver must consciously pull knob 160 after entering the vehicle and closing the door. The transmission operated restraining means does not affect knob 160, and the regulator device is operable after the transmission lever is moved into "drive" position. Hence, this restraining means may be used to supplement the door-operated restraining means if the extra expense is justified.

A characteristic of manifold vacuum, as discussed previously, is utilized to enable relatively slow automatic-acceleration following such automatic activation or engagement at a speed less than the governed speed. In all carbureted engines, the manifold vacuum reduces from about 19 inches of mercury at no-load to about one inch of mercury at full-load as the throttle is opened. Such automatic acceleration is accomplished by the device shown in FIG. 1, according to the present invention, by selecting the spring 46 so that the diaphragm vacuum in chamber 44 is never more than a preselected value, such as 5 or 6 inches of mercury for example, which is a minimum for the manifold vacuum in this instance. As previously explained the throttle opening at the minimum *manifold* vacuum corresponding to this maximum *diaphragm* vacuum restricts the acceleration rate sufficiently to enable safe automatic acceleration. If the spring 46 is selected to provide a working (maximum) diaphragm vacuum of 8–9 inches of mercury (or higher), the acceleration rate is even slower after automatic-activation. However, this desirable result is accomplished at the expense of reducing further the engine power at which the governed speed can be maintained.

It is important to appreciate that the parts in the vacuum supply circuit (such as the passage in hose nipple 144, valve body 154, valve unit 170 and the tubes 120, 61' and 61) offer substantially no resistance or "line-loss" with all air-flows regardless of the openings of valves 64, 48 and 104. The only intended restrictions during normal speed governor operation are at orifices 54 and 58, operating as described in cooperation with valves 48 and 64, respectively. The air bleed itself is provided primarily to enable pilot valve 48 to control pressure.

In the form of control system shown in FIG. 1, a "double-abutment" or "double-override" linkage mechanism is provided. With this system, constructed as described above, when the governor override means 29 operates throttle 16, as in FIG. 1, the accelerator override 35 enables the accelerator and its entire linkage (elements 20 and 21) to be biased by spring 24 to stand in their idle position. Since the friction and inertia of the accelerator and its linkage does not have to be overpowered by the speed governor mechanism, the size of servomotor 7 can be substantially reduced. A smaller servo-motor will respond faster, since in the form shown in FIG. 1, for example, less air must be displaced. Any servo-motor, regardless of the type of energy used therein, can be made to respond faster by reducing its size providing the required forces are reduced. With a faster response, a speed governor mechanism is more stable without "hunting." An optional advantage of the double-abutment system is to maintain the size of the servo-motor, but select spring 46 to operate at much lower manifold vacuum; then the regulator maintains the set speed at a higher engine power. If the lost-motion unit 35 is replaced by a pin connection, then diaphragm 40 must operate link 21 and accelerator 20 in its speed-regulating movements.

I have observed in my own driving of speed control devices that when traversing highway curves, there is a tendency to continue at the preset speed even if the rate ought to be reduced 5 to 10 m.p.h. for safety purposes. Several means are disclosed herein to sense the radius of highway curvature and automatically reduce the speed temporarily as required on such highway curves. One form of such curve compensation means, as disclosed in FIG. 1, comprises a weight 240 secured to a plate 242 pivoted for angular movements to the left or right of the direction of the vehicle (viewed from above in FIG. 1). A pair of links 244 and 246 have diametrically opposite lost-motion connections with plate 242. The links 244 and 246 are hingably conected to arms 248 and 250, respectively, which in turn are hinged to pins secured to the walls of an extension cover 77a. One arm includes a pin 252 cooperating with a slot of the other arm and is connected to a spring 254 attached to the swingable arm 49. Spring 254 is very light in relation to speeder spring 62 so that the movement of arm 248 only varies the regulated speed a small amount.

The curve compensation device operates as follows during "automatic thottle" operation: On straight roads, the weight is maintained in its central position by the force of spring 254. In a right curve, weight 240 moves upwardly (FIG. 1) which pulls arm 250 and extends spring 254 an amount dependent on the radius of highway curvature; at this time, arm 248 and link 244 are carried along in a lost-motion action. The extension of spring 254 causes valve 48 to open slightly which reduces the regulated speed such as 5 to 10 m.p.h.; a greater highway curvature causes a greater temporary speed reduction. As the highway straightens out, the weight 240 gradually returns to its central position to gradually restore the preset governed speed. When the highway curves to the driver's left, the reverse action occurs; weight 240 moves to the right because of centrifugal force (downwardly in FIG. 1) whch pulls link 244 and arm 248 to extend spring 254 an amount dependent on the radius of highway curvature; arm 250 and link 246 are carried in a lost-motion action. The speed is temporarily reduced by extending spring 254, and the preset speed is restored as the highway straightens out.

The curve-compensation means provides another safety factor in addition to the actual automatic reduction of speed in curves. This second safety factor is that the periodic and automatic change in speeds tends to reduce the possibility of so-called, "highway-hypnosis."

MODIFICATIONS OF FIGS. 10–16

Figure 10:
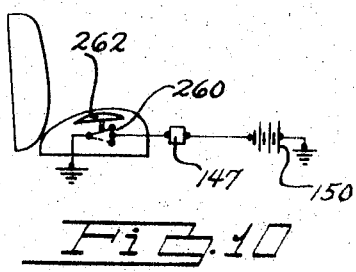
FIG. 10 is a diagrammatic view of an alternate form of restraining means operated by the vehicle seat.

FIGS. 10–16 are modifications of the form of the invention shown in FIGS. 1–9. FIG. 10 shows a modified restraining means in which the solenoid 147 is controlled by a switch 260 operated by the vehicle seat 262. The switch is arranged to pass across a circuit contact whenever the vehicle-driver rests on the seat and also when he leaves the seat. The electrical contact is made only temporarily in each movement of the seat (which is a movable vehicle element). Thus, the solenoid 147 is energized each time the driver enters or leaves the vehicle to render the speed regulator mechanism inoperative in a manner described above.

Figure 11:
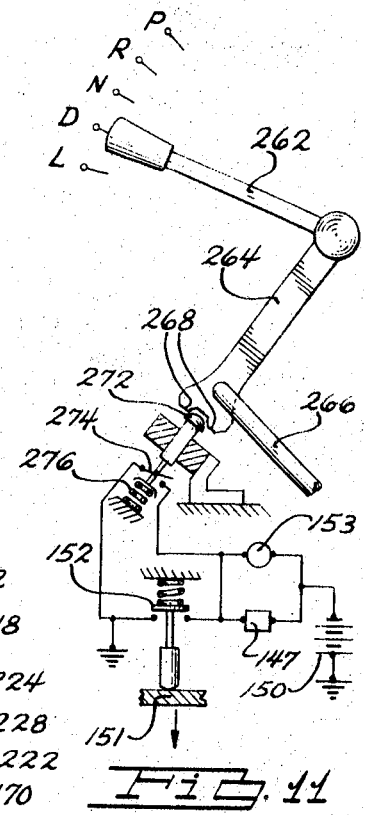
FIG. 11 is a diagrammatic view of an alternate or supplemental form of restraining means operated by the vehicle transmission lever.

FIG. 11 is another form of transmission-operated restraining means in which the usual transmission lever 262 operates the conventional links 264 and 266 to the transmission. Link 264 includes a pair of cam-acting tabs 268 which individually operates a pin 272 only when the selector lever is moved out of (and into) "drive" position; this action closes a switch 274 biased open by a spring 276 and which energizes solenoid 147 to render the speed regulator mechanism inoperative in a manner described above. Since the switch is closed only when lever 64 is in motion adjacent the "drive" position of selector 262, switch 274 is always open in all other positions of the selector lever. As stated previously, it is presently believed that the transmission operated restraining means is best suited to provide a supplemental safety action. Hence, the switch 152 operated by a door 151 is connected in parallel with switch 274 to operate solenoid 147 in a manner described above.

Figure 12:
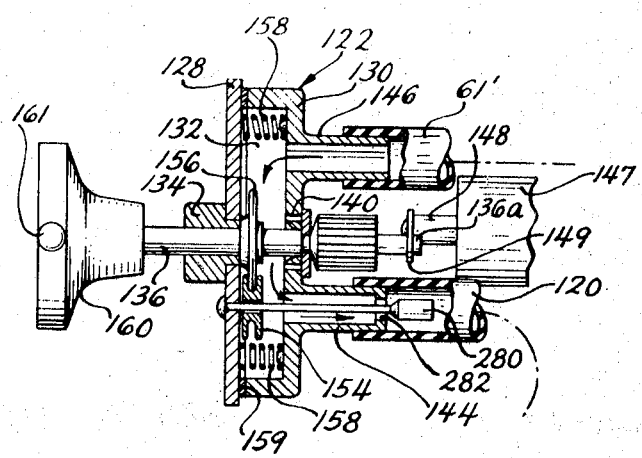
FIGS. 12 and 13 are partial sectional views of a supplemental form of restraining means operated by engine vacuum and modified from the form shown in FIGS. 1–4 as would be seen along the line 1—1 of FIG. 4.
Figure 13:
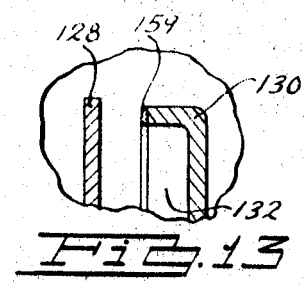

FIGS. 12 and 13 disclose another supplemental restraining means which may be added to provide more safety action, if warranted by the extra expense. The form of selector machanism illustrated in FIGS. 12 and 13 of the present invention comprises means forming a chamber adapted to be sealed by a cover to contain air under vacuum which maintains the seal when the manually-operated means is moved to provide such transfer of vacuum; the cover forms one or more walls of the chamber and is movable with and by the manual means to open the chamber to atmosphere and "break" the vacuum when the manual means stands in its inoperative position.

In the modification of FIGS. 12 and 13, the cover 130 is not secured to plate portion 128, but is movable away therefrom, as shown in FIG. 13, by a pair of springs 158. At this time, chamber 132 is open to the atmosphere. The cover includes a sealing member 159, such as a gasket.

When the vehicle is at rest, the cover 130 is separated from plate 128 by the springs 158, as shown in FIG. 13; at this time a valve 280 closes an orifice 282. After the engine is started, vacuum is produced in tube 120 only to the valve 280, and the cover remains in the position shown in FIG. 13. When the driver pulls the knob 160, the left end of gear 138 acts on disc-valve 142 (FIG. 3) to force the cover 130 against plate 128 to form and close the chamber 132, and all parts are then in the position shown in FIG. 12. At this time the orifice 282 is open, and substantially the full manifold vacuum is transmitted to chamber 132, and tube 61'. The vacuum in chamber 132 acts on the full exposed inside area of the cup-shaped rectangular cover 130 to overpower the force of springs 158. Thus the vacuum itself acts to hold the cover to close chamber 132 as long as sufficient vacuum is maintained therein.

When the engine is shut off, the manifold vacuum dissipates in source tube 120. Without vacuum in chamber 132, the springs 158 move the cover 130 to the position shown in FIG. 13. This action carries the knob 160 to the position 160' (FIG. 3), but it also can be forced to this position by the driver any time he decides to render the speed control inoperative. At this time, valve 280 closes orivce 282, and with the large gap in chamber 132, the operator must again deliberately pull knob 160 into the position shown in FIG. 12. If this is performed while the vehicle is being driven by the operator, the cover is held in its ready position and the automatic throttle can be activated as before, but as illustrated herein, only after depressing the brake pedal once. Since this restraining means is operated by an engine function, it preferably is used to supplement the door-operated restraining means.

Figure 14:
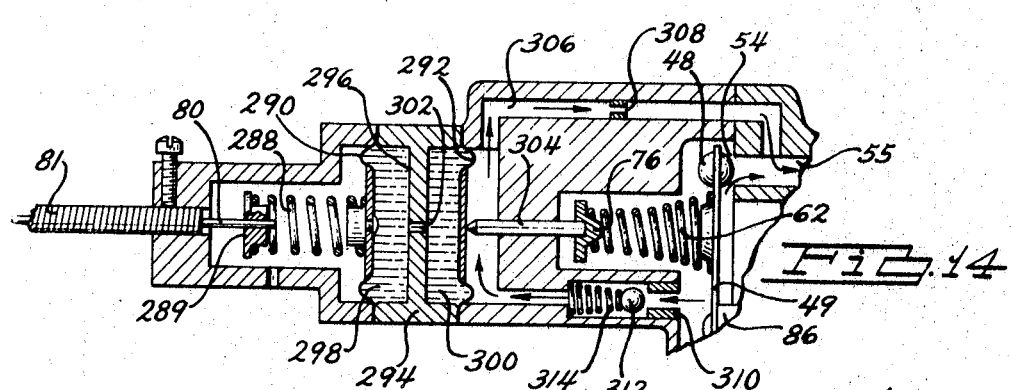
FIG. 14 is a fragmentary and partial sectional view of a modified form of the speed sensing means illustrated in FIG. 1 which provides a retarded rate of acceleration.

FIG. 14 is a modification of FIG. 1 in which means are provided to retard the rate of acceleration, and which also can provide surgeless regulation, even for a reverse or negative speed droop. Referring to FIGS. 1 and 14, a fluid delay mechanism is inserted between speeder spring 62 and a control spring 288 suitably secured to a retainer 289 connected to flexible shaft 80. The delay mechanism comprises a pair of diaphragms 290 and 292 sealably enclosing a housing 294 having a partition or wall 296. The partition forms two chambers 298 and 300 enclosed by diaphragms 290 and 292, respectively, acting as movable walls for the chambers. A small fixed orifice 302 (which could be manually adjustable) is provided in partition 296 to restrict fluid flow between the chambers. A shaft 304 slides in a bore of the housing to transmit forces between diaphragm 292 and spring 62. Control spring 288 is secured at one end to diaphragm 290 so that it can act both as a tension and compression spring. An air bleed passage 306 communicates with passage 55 and includes a pair of orifices 308 and 310 to control pressure therebetween acting on diaphragm 292. Atmospheric air enters orifice 310 and may be controlled by a valve 312 biased by a spring 314; and the air then flows through orifice 308 into passage 55 subjected to vacuum which induces the air-bleed through passage 306. A vacuum acts on diaphragm 292 which produces a force acting on spring 62. Any force-setting of control spring 288 is transmitted through the fluid delay mechanism to the speeder spring 62, so the system is always balanced.

The operation to retard acceleration is as follows, referring to FIGS. 1, 9 and 14: When the brake pedal is depressed and vacuum dissipates in tube 61, the vacuum in passages 56 and 306 also is cancelled. This action reduces the force on the speeder spring 62 which then moves diaphragm 292 to the left (FIG. 14) to displace oil from chamber 300 to 298. After the driver manually accelerates the vehicle slightly and then depresses the accelerator temporarily to cause brake valve 190 to open, the vehicle starts to accelerate automatically. But now the speeder spring 62 is at a low force which slowly increases as the vacuum from passage 306 pulls diaphragm 292 to the right (FIG. 14) only as fast as oil flows from chamber 298 to chamber 300 until the balanced setting of speeder spring 62 is restored to the valve set by shaft 80. Hence the rate of automatic acceleration is retarded to an extent determined by orifice 302, in which a smaller orifice reduces the acceleration rate.

In the foregoing action, the ball valve 312 and spring 314 can be arranged to provide only acceleration delay, or in addition to provide speed droop control. If spring 314 is of low rate, a constant vacuum is maintained on diaphragm 292 whenever vacuum exists in passage 55; this condition would prevail for the example described above. As the rate of spring 314 is increased, the action of valve 312 changes toward the condition of a fixed orifice as would be produced by orifice 310 alone. This effects a slight but gradual increase in vacuum on diaphragm 292 as a function of the increase in vacuum in passage 55 (and chamber 44) which, in turn, is a function of an increase of throttle opening. Hence, as the throttle opens during regulator operation, the vacuum on diaphragm 292 increases, although by a lesser amount. This action increases the force of the speeder spring 62 as the throttle opens, which approaches isochronous operation or even a reverse speed droop. The governing action is completely stable, even with a negative droop, because of the fluid delay mechanism. In the foregoing example, if the stable speed at full load is higher than at no load because of the reset action, the throttle is delayed in its increase to the higher speed to advance only as fast as the engine speed can accelerate to this higher value. This delay is caused by the restrictive effect of orifice 302 in retarding compression of spring 62 when the increased vacuum acts on diaphragm 292. Without this delay mechanism, in a reverse speed droop, the throttle would snap open instantly before the engine can accelerate cannot surge. If the load decreases, the reset action is reversed which causes the regulated speed to decrease slightly.

I have found that a slight negative speed droop of a few miles per hour provides a continuous subconscious surprise when driving on turnpikes which tends to prevent "highway hypnosis." However, this novel reset action can prevent surging during isochronous operation or with any other speed droop in all production units.

Figure 15:
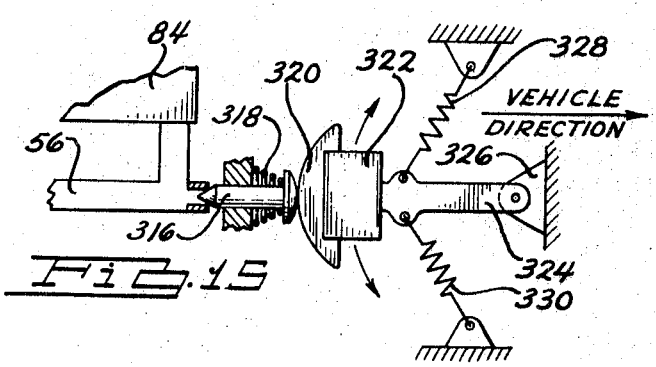

FIG. 15, which is viewed from the top of the vehicle, discloses a modified curve-compensation mechanism which has the advantage of separate installation; this enables the device to be added for more expensive vehicles and omitted from lower cost vehicles. In FIG. 15, a normally closed bleed valve 316 is biased open by a spring 318 to ride on a cam 320 carried by a weight 322 secured to an arm 324 fulcrummed at a support 326 for swingable movements. A pair of springs 328 and 330 are secured at one end to arm 324 and at another end to fixed supports.

In operation, when the highway curves to the right, the centrifugal force of weight 322 causes movement thereof to the left (upward in FIG. 15) which causes valve 316 to open and bleed air into passage 56. This action reduces the regulated speed by an amount which increases as the highway curvature increases. The weight gradually returns to the position shown as the highway straightens out which shuts the air bleed at valve 316 to restore the original speed. When the highway curves to the left the curve compensation action reverses.

Figure 16:
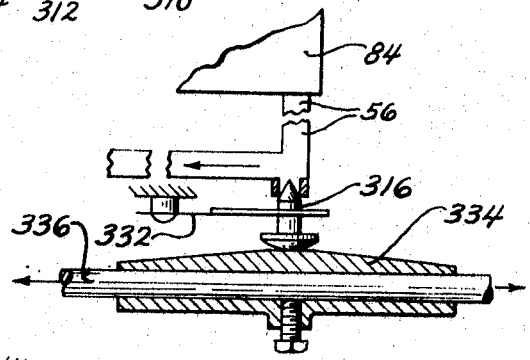
FIGS. 15 and 16 are fragmentary sectional views of several modifications of the form of the invention shown in FIG. 1, to provide an automatic reduction of vehicle speed on highway curves.

FIG. 16 discloses another modified curve-compensation means in which the air bleed valve 316 is normally closed and supported by a leaf spring 332 fixed at one end and prebent to bias the valve in an opening direction. The valve abuts a longitudinal cam 334 operated by a portion of the steering linkage such as the steering wheel shaft, or the steering link 336 as illustrated in FIG. 16. In operation, whenever the highway curves to the left, the steering wheel is turned to the left which moves link 336 to the right (as in FIG. 16). This action enables cam 334 to open bleed valve 316 which reduces the governed speed as a function of an increase in highway curvature in the same manner as for the modification of FIG. 15. When the steering wheel is returned to normal, valve 316 gradually closes to return the regulated speed to the higher value established by rotation of knob 160. When the highway curves to the right, the curve compensation reverses.

In considering the overall speed control system now completely described above, it is apparent that an additional advantage in the inherent simplicity of installation. The selector unit 122 is secured to the underside of any instrument panel, as by sheet metal screws. The brake valve unit 170 is clamped to the steering post and made adjustable so that actuator 208 is tangent to the usual suspended brake arm of any car, and it is not necessary to connect parts to the brake arm. The sensor-brain unit is connected in series to the conventional speedometer shaft. Only one bracket is necessary to support the servo-motor unit 7, which is easily connected by chain 29 having an adjustable clamp or bracket securable to the carburetor lever, or any movable part of the accelerator carburetor linkage. The wires of solenoid 147 are connected to the door switch circuit, standard in all automobiles.

Also, the "Braille" or touch system of speed-setting is particularly useful in combination with the automatic acceleration action described above. The driver can feel the tactile indicator to set the desired speed (with surprising accuracy) without moving his sight from the road. After pulling the knob and depressing the brake pedal once, the driver accelerates the vehicle by mild depression of the accelerator until a low speed such as 10–15 m.p.h. is attained. At any desired speed less than the preset speed, he then depresses the accelerator smoothly but firmly until a click is heard, and removes his foot from the accelerator. The regulator then automatically accelerates the vehicle to the preset speed and maintains this speed until cancelled by depressing the brake pedal. The entire improved operation is accomplished by the sense of touch without any visual aids or reference lines.

What is claimed is:

1. In a speed control device for automotive vehicle including an engine having control means therefor normally advanced to increase vehicle-speed, and conversely, said vehicle including brake-actuating means, and including a source of energy, the combination comprising; a regulator mechanism for effecting automatic regulating movements of said control means in a direction tending to maintain a preselected regulated vehicle speed, said mechanism including servo-motor means operatively connected to said control means for causing said speed-regulating movements thereof, said regulator mechanism also including sensing means responsive to changes in a signal accompanying a change in vehicle speed to produce forces varying as a function of vehicle speed, pilot means responsive to changes in the sensing means forces for directing at least a portion of said energy to said servo-motor for causing said speed regulating movements thereof, biasing means acting on said pilot means with a predetermined force manually adjustable selectively by the vehicle-driver to establish said preselected regulated vehicle speed, release means operated by said brake-actuating means upon normal movements thereof to at least temporarily inactivate said regulator mechanism with respect to said control means, and delay means operatively associated with said biasing means to restrict the rate of change of said force thereof whenever same is readjusted by said driver to select a new preselected vehicle speed.

2. The combination of means defined in claim 1, and said delay means including diaphragm means acting on said biasing means and forming two fluid chambers, said diaphragm means including a pair of diaphragms respectively enclosing and sealing each of said chambers, orifice means connecting said chambers to enable fluid to flow from one chamber to the other chamber upon a change of force on one of said diaphragms, a first of said two diaphragms acting on said biasing means, and manually selectable means acting on said second diaphragm to pressurize said fluid for establishing said predetermined adjustable force acting on said biasing means with a delayed response of said first diaphragm when said fluid is caused to flow through said orifice means to cause said restricted rate of change of said force of said biasing means.

3. In a speed control device for an automotive vehicle including an engine having control means therefor normally advanced to increase vehicle-speed, and conversely, said vehicle including brake-actuation means, and including a source of energy, the combination comprising; a regulator mechanism for effecting automatic regulating movements of said control means in a direction tending to maintain a preselected regulated vehicle speed, said mechanism including servo-motor means operatively connected to said control means for causing said speed regulating movements thereof, said regulator mechanism also including sensing means responsive to changes in a signal accompanying a change in vehicle speed to produce forces varying as a function of vehicle speed, pilot means responsive to changes in the sensing means forces for directing at least a portion of said energy to said servo-motor for causing said speed regulating movements thereof, biasing means acting on said pilot means with a predetermined force to establish the speed of the vehicle, activating means operatively associated with said mechanism and initiated selectively by the vehicle-driver entirely at his discretion to automatically cause activation of said mechanism with respect to said control means at a speed lower than said preselected speed, release means operated by said brake-actuating means upon normal movements thereof for rendering said regulator mechanism inactive but not inoperative with respect to said control means, said regulator mechanism being constructed and arranged to effect automatic acceleration of the vehicle from said lower speed to said preselected speed and tending automatically to maintain said preselected regulated speed thereafter, delay means operatively associated with said biasing means and said activating means to change said biasing force when the vehicle speed reduces as a result of said normal movements of said brake-actuating means, said delay means including means to return said biasing means force in a direction toward said predetermined value as a result of said selective activation of said mechanism, and said delay means including means to restrict the rate of said return of said biasing means force to said predetermined value for restricting the rate of said automatic acceleration.

4. In a speed control device for an automotive vehicle including an engine having control means therefor normally advanced to increase vehicle-speed, and conversely, and including vehicle brake-actuating means, said vehicle having a source of fluid pressure, the combination comprising; a regulator mechanism operatively associated with said control means and including means operated by at least a portion of said fluid pressrue to produce forces acting on said control means in response to a signal accompanying a change in the speed of the vehicle to effect automatic regulating movements of said control means in a direction tending to maintain a preselected regulated speed of the vehicle, valve means operated by said brake-actuating means to effect a low value of said pressure portion upon each actuation of said brake-actuating means to render said regulator mechanism inactive but not inoperative, and to provide a higher value of said pressure portion for reactivation of said regulator mechanism selectively by the vehicle-driver upon advancing said control means after releasing said brake-actuating means, said re-activation being effected at a vehicle speed lower than said regulated speed, said regulator mechanism being constructed and arranged to effect automatic acceleration of the vehicle from said lower speed to said regulated speed and tending automatically to maintain said preselected regulated speed thereafter, a fluid delay device including diaphragm means subjected to said pressure portion to provide forces acting on said regulator mechanism for establishing said preselected speed during said automatic regulating movements thereof and to change said diaphragm forces when said pressure portion is diminished upon actuation of said brake-actuating means, and said delay device including fluid means to restrict the application of said diaphragm forces to said regulator mechanism when a higher pressure portion is restored as a result of said re-activation of said mechanism to restrict the rate of said automatic acceleration.

5. The combination of means defined in claim 4, and said delay device including first yieldable means acting on said regulator mechanism, two fluid chambers, said diaphragm means including a pair of diaphragms respectively enclosing and sealing each of said chambers, orifice means connecting said chambers to enable fluid to flow from one chamber to the other chamber upon a change of said pressure portion, a first of said two diaphragms acting on said first yieldable means, and manually adjustable second yieldable means acting on said second diaphragm with a delayed response of said first diaphragm when said fluid is caused to flow through said orifice means after said higher value of said pressure portion is restored to establish said preselected regulated speed.

6. In a speed control device for an automotive vehicle including an engine having control means therefor, the combination comprising; a regulator mechanism operatively associated with said control means and adapted to produce forces acting thereon in response to a signal accompanying a change in vehicle speed to effect automatic regulating movements of said control means in a direction tending to maintain a preselected regulated speed of the vehicle, said regulator mechanism including biasing means to establish said preselected speed, reset means operatively associated with said mechanism to provide a force for modifying said biasing means and varying as a function of the position of said control means, and said reset means including means to delay the application of said modifying force to said biasing means upon an automatic initial change of said control means resulting from a change in engine load to provide any desired speed drop with stability.

7. In a speed control device for an engine having control means therefor, the combination comprising; a regulator mechanism operatively associated with said control means and adapted to produce forces acting thereon in response to a signal accompanying a change in engine speed to effect automatic regulating movements of said control means in a direction tending to maintain a preselected regulated speed of the engine, said regulator mechanism including a spring to establish said preselected speed, reset means operatively associated with said mechanism to provide a force acting directly on said spring and varying as a function of the position of said control means, and said reset means including means to delay the application of said last-named force to said spring upon an automatic initial change of said control means resulting from a change in engine load to provide any desired speed droop with stability.

8. In speed control device for an automotive vehicle including an engine having control means therefor normally advanced to increase vehicle-speed, and conversely, and including vehicle brake-actuating means, said vehicle including means providing a fluid pressure that varies as a function of the position of said control means, the combination comprising; a regulator mechanism operatively associated with said control means and adapted to produce forces acting thereon in response to a signal accompanying a change in the speed of the vehicle to effect automatic regulating movements of said control means in a direction tending to maintain a preselected regulated speed of the vehicle, said regulator mechanism including biasing means manually adjustable by the vehicle-driver to provide forces for establishing said preselected speed, release means operated by said brake-actuating means upon normal movements thereof to at least temporarily inactivate said regulator mechanism with respect to said control means, and reset means including fluid time delay means operatively associated with said biasing means, said reset means including means having a delayed response to changes in said varying pressure to affect said forces provided by said biasing means to delay an automatic change of said control means resulting from a change in engine load for providing any desired speed droop with stability.

9. The combination of means defined in claim 8, and said delay means including diaphragm means acting on said biasing means and forming two fluid chambers, said diaphragm means including a pair of diaphragms respectively enclosing and sealing each of said chambers, orifice means connecting said chambers to enable fluid to flow from one chamber to the other chamber upon a change of force on one of said diaphragms, one of said two diaphragms acting on said biasing means to produce said forces thereof, said varying pressure disposed to act on one of said diaphragms to pressurize said fluid for modifying said biasing means force with a delayed response of said last-named one diaphragm when said fluid is caused to flow through said orifice means to cause said restricted rate of change of said biasing means force for providing any desired stable speed-droop.

10. In a speed control device for an automotive vehicle including an engine having control means therefor normally advanced to increase vehicle-speed, and conversely, the combination comprising; a regulator mechanism for effecting automatic regulating movements of said control means in a direction tending to maintain a preselected regulated vehicle speed, said mechanism including pressure-responsive means operatively connected to said control means for effecting said speed-regulating movements thereof, a fluid circuit having a source of fluid pressure for operating said pressure responsive means, said regulator mechanism also including sensing means responsive to changes in a signal accompanying a change in vehicle speed to produce forces varying as a function of vehicle speed, said mechanism including valve means responsive to changes in the sensing means forces for controlling pressures in said circuit acting on said pressure-responsive means for causing said speed-regulating movements thereof, said valve means including a movable valve member and a mating member cooperable therewith, the configuration of said valve member in relation to said mating member being adapted to produce modulated pressures acting on said pressure responsive means and varying as a function of the position of said valve member, said mechanism including biasing means to provide forces acting on said valve means to establish the speed of the vehicle, reset means including pressure-sensitive means acting on at least a portion of said biasing means, said modulated pressures being disposed to act on said pressure-sensitive means in a direction enabling changes of said modulated pressures to cause a reset of vehicle-speed in a reduced speed direction when the engine load reduces, and conversely, said reset means including delay means for delaying said changes in said modulated pressures acting on said pressure-sensitive means when said engine load changes to prevent responding movements of said control means from excessively preceding actual resulting changes in vehicle-speed during said automatic speed-regulating action for providing stable regulation at any desired speed-droop.

References Cited

UNITED STATES PATENTS

| 2,929,616 | 3/1960 | Fox | 137—36 |
| 2,966,224 | 12/1960 | Teetor | 123—103 |
| 2,990,821 | 7/1961 | Cramer | 251—54 X |
| 3,275,008 | 9/1966 | Kerensky | 137—36 |
| 3,426,777 | 2/1969 | Plummer | 251—54 X |

KENNETH H. BETTS, Primary Examiner

U.S. Cl. X.R.

123—103; 251—54, 294